W. F. JOHNSTON.
Dentists' Files.

No. 156,485. Patented Nov. 3, 1874.

Witnesses:
Will. H. Dodge

Inventor:
Wilbur F. Johnston
by Dodge & Son
Attys.

UNITED STATES PATENT OFFICE.

WILBUR F. JOHNSTON, OF BROOKLYN, NEW YORK.

IMPROVEMENT IN DENTISTS' FILES.

Specification forming part of Letters Patent No. 156,485, dated November 3, 1874; application filed August 31, 1874.

*To all whom it may concern:*

Be it known that I, WILBUR F. JOHNSTON, of Brooklyn, in the county of Kings and State of New York, have invented certain Improvements in Dentists' Files, of which the following is a specification:

My invention relates to dentist's tools; and the invention consists in providing the end of the tool used as a handle with holes, whereby it is adapted to be securely held without the addition of any other handle, and whereby it can be made very light, simple, and cheap, all as hereinafter more fully set forth.

Figure 1:
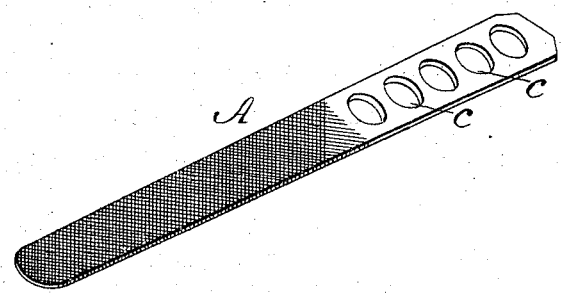
Figure 2:

Figure 1 is a perspective view, and Fig. 2 is a longitudinal section, of a file made on my plan.

Small tools, similar to dentists' and jewelers' files, are usually made without a handle, the teeth being cut on one end of a flat piece of steel, the other being left smooth, or are provided with a tang for applying a handle of wood or other material. If made without a specially-prepared handle, it is difficult to hold them firmly between the thumb and finger, and if provided with a separate handle of wood or similar material, the added handle necessarily increases the size, which increase of size is often very objectionable. To obviate these difficulties is the object of my invention.

In constructing a file, for instance, on my plan, I make it of a flat piece of steel, having the teeth cut on a portion thereof, as shown in Fig. 1, with one end left flat and smooth. I then punch or otherwise form a series of holes, *c*, in the portion which is to constitute the handle, thereby enabling it to be held with ease and firmness between the thumb and finger, without rendering it otherwise objectionable. The holes may be of any desired size, and more or less in number, and they may be arranged in any manner that fancy or experience may dictate.

While this improvement is especially applicable to the small files used by dentists and jewelers, it is obviously equally applicable to various other small tools used by them, and I so intend to apply it.

Having thus described my invention, what I claim is—

A file or similar small tool having the portion of its blade or body which is extended to form a handle perforated, substantially as and for the purpose set forth.

WILBUR F. JOHNSTON.

Witnesses:
 EUGENE J. HAMILTON,
 GEORGE CROWLEY.